(12) United States Patent
Berkemeier et al.

(10) Patent No.: US 9,976,512 B2
(45) Date of Patent: May 22, 2018

(54) INTERNAL COMBUSTION ENGINE WITH DIRECT INJECTION AND REDUCED PARTICULATE EMISSIONS

(71) Applicant: Ford Global Technologies, LLC, Dearborn, MI (US)

(72) Inventors: Oliver Berkemeier, Bergisch Gladbach (DE); Jan Linsel, Cologne (DE); Kay Hohenboeken, Cologne (DE); Marco Marceno, Hagen (DE); Jens Wojahn, Bergisch Gladbach (DE); Klemens Grieser, Langenfeld (DE)

(73) Assignee: Ford Global Technologies, LLC, Dearborn, MI (US)

( * ) Notice: Subject to any disclaimer, the term of this patent is extended or adjusted under 35 U.S.C. 154(b) by 1172 days.

(21) Appl. No.: 13/944,692

(22) Filed: Jul. 17, 2013

(65) Prior Publication Data
US 2014/0039780 A1   Feb. 6, 2014

(30) Foreign Application Priority Data

Aug. 3, 2012   (DE) .................. 10 2012 213 808

(51) Int. Cl.
*G06F 7/02*   (2006.01)
*F02D 41/40*   (2006.01)
*F02D 35/02*   (2006.01)
*F02D 41/10*   (2006.01)

(52) U.S. Cl.
CPC .......... *F02D 41/401* (2013.01); *F02D 35/026* (2013.01); *F02D 41/10* (2013.01); *F02D 2250/38* (2013.01); *Y02T 10/44* (2013.01)

(58) Field of Classification Search
CPC ...... F02D 41/401; F02D 35/026; F02D 41/10; F02D 2250/38; Y02T 10/44
See application file for complete search history.

(56) References Cited

U.S. PATENT DOCUMENTS

| 3,815,564 | A | * | 6/1974 | Suda | ................ | F02D 1/18 |
| | | | | | | 123/499 |
| 4,594,988 | A | * | 6/1986 | Tompkins, Jr. | ........ | F02M 59/44 |
| | | | | | | 123/502 |
| 4,800,860 | A | * | 1/1989 | Nanyoshi | ................ | F02D 41/10 |
| | | | | | | 123/492 |

(Continued)

FOREIGN PATENT DOCUMENTS

EP   0843087 A2   5/1998
JP   2001012286 A   1/2001

OTHER PUBLICATIONS

Yi, Jianwen James et al., "Approach for Controlling Exhaust Gas Recirculation," U.S. Appl. No. 13/648,563, filed Oct. 10, 2012, 41 pages.

(Continued)

*Primary Examiner* — David Hamaoui
(74) *Attorney, Agent, or Firm* — Julia Voutyras; McCoy Russell LLP

(57) ABSTRACT

Methods are provided for an engine including modifying fuel injection timing based on engine operating conditions. A delay time period calculation may be based on a comparison of a first engine load with a second engine load. Further, a modified injection start time, based on a delay time period, may include injecting fuel during the compression cycle of an engine.

10 Claims, 4 Drawing Sheets

(56) References Cited

U.S. PATENT DOCUMENTS

| | | | | |
|---|---|---|---|---|
| 5,241,939 | A * | 9/1993 | Nonaka | F02B 61/045 |
| | | | | 123/492 |
| 6,655,133 | B2 * | 12/2003 | Mikami | F01N 3/023 |
| | | | | 60/296 |
| 6,968,830 | B2 * | 11/2005 | Glenn | F02D 41/401 |
| | | | | 123/357 |
| 7,051,715 | B2 * | 5/2006 | Chen | F02D 31/007 |
| | | | | 123/500 |
| 7,239,954 | B2 * | 7/2007 | Huang | F02D 41/0002 |
| | | | | 123/434 |
| 7,475,671 | B1 * | 1/2009 | Fattic | F02D 35/026 |
| | | | | 123/406.47 |
| 8,165,788 | B2 | 4/2012 | Surnilla et al. | |
| 8,521,399 | B2 * | 8/2013 | Peters | F02D 41/0025 |
| | | | | 123/406.47 |
| 8,560,211 | B2 * | 10/2013 | Heverley, III | F02D 41/345 |
| | | | | 123/478 |
| 8,775,057 | B2 * | 7/2014 | Arihara | F02D 35/026 |
| | | | | 123/299 |
| 2012/0143477 | A1 | 6/2012 | Ruona et al. | |
| 2012/0245827 | A1 | 9/2012 | Glugla et al. | |
| 2013/0255631 | A1 | 10/2013 | Ruhland et al. | |

OTHER PUBLICATIONS

Rumpsa, Todd Anthony, "Method for Operating a Direct Fuel Injector," U.S. Appl. No. 13/852,824, filed Mar. 28, 2013, 26 pages.

\* cited by examiner

INTERNAL COMBUSTION ENGINE WITH DIRECT INJECTION AND REDUCED PARTICULATE EMISSIONS

CROSS REFERENCE TO RELATED APPLICATIONS

The present application claims priority to German Patent Application No. 102012213808.0 filed on Aug. 3, 2012, the entire contents of which are hereby incorporated by reference for all purposes.

FIELD

The application relates to a control method for an internal combustion engine, and to an internal combustion engine, which is designed to carry out the control method, and to a motor vehicle having an internal combustion engine of this kind.

BACKGROUND AND SUMMARY

Particulate emissions have been the focus of technical development in internal combustion engines for quite some time since particulates are believed to be carcinogenic. A continual reduction of the quantity of particulates emitted is desired and driven by corresponding legislation.

In the case of internal combustion engines with direct injection, fuel is injected directly into the combustion chamber (piston, cylinder) of the internal combustion engine and ignited during a revolution cycle. In this case, the precise times of the beginning of injection of the fuel into the combustion chamber and of the ignition are normally determined using the significant operating parameters of the internal combustion engine, such as engine speed and engine load. In the prior art, the times are generally chosen in such a way that low fuel consumption is achieved for a given engine power output.

In one example, some of the above issues may be addressed by a control method comprising, a starting time for an injection of fuel into a combustion chamber of the internal combustion engine in accordance with operating parameters of the internal combustion engine. Here, the starting time can be determined in a conventional manner and, in particular, in accordance with the engine speed and engine power output of the internal combustion engine. In addition, a first engine load of the internal combustion engine may be determined at a first time. This first time can be before or after the determination of the starting time or, alternatively, simultaneous with the determination of the starting time. At a later, second time, a second engine load of the internal combustion engine may be determined. As a result, there are two values available for the engine load of the internal combustion engine at different times, and these are then compared with each other. A delay time period may be determined in accordance with a result of the comparison of the first and the second engine load. Injection of the fuel into the combustion chamber of the internal combustion engine may then carried out, beginning at a time offset from the starting time by the delay time period.

In another example, a method includes temporarily delaying a start of injection of directly injected fuel to an engine cylinder in response to an increase in engine load; but temporarily advancing the start of injection of directly injected fuel to the engine cylinder in response to a decrease in engine load. Such operation is in contrast with extended timing adjustments responsive to engine load for steady-state operation. In this way, smoke production may be reduced, while maintaining steady-state efficiency performance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
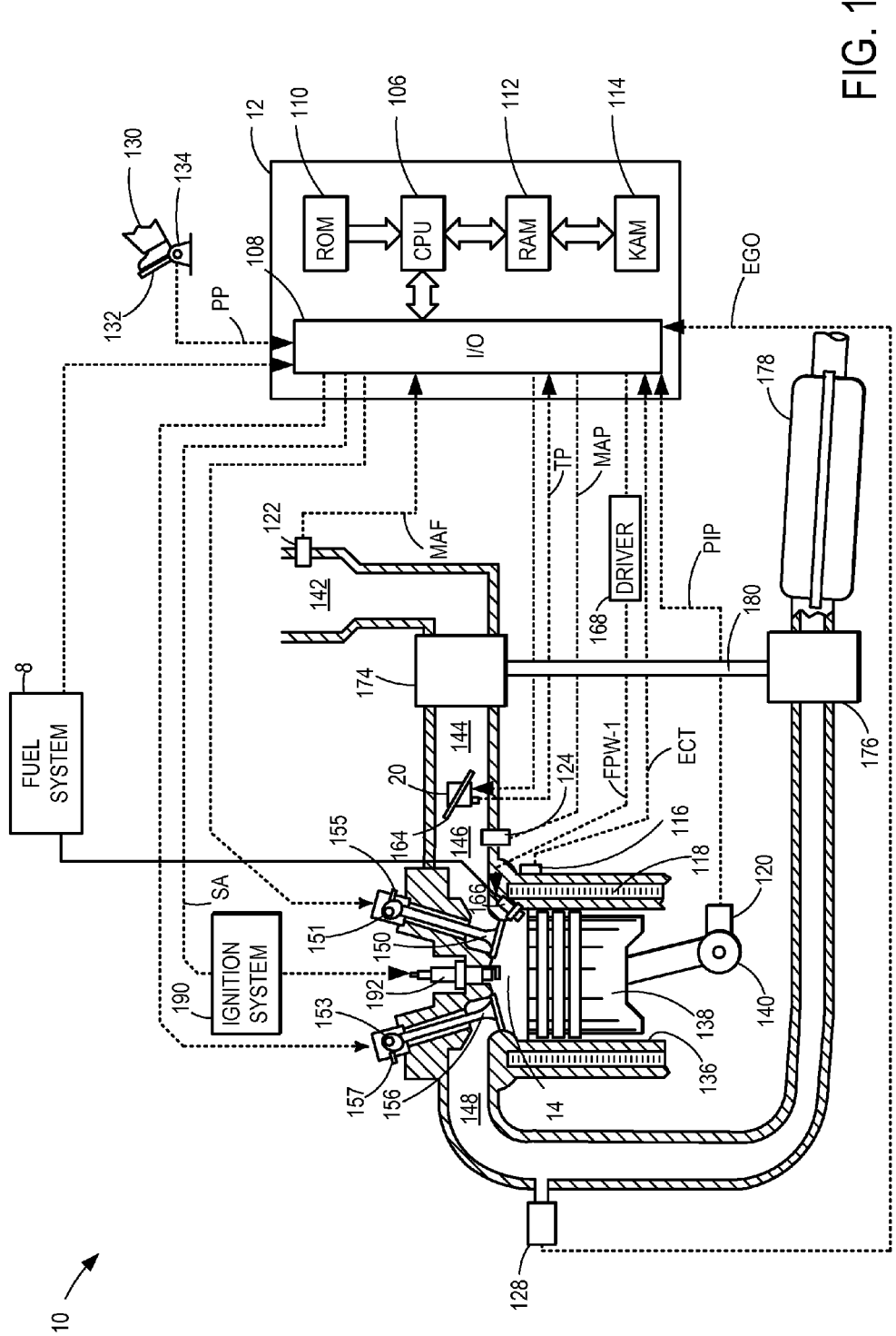
FIG. 1 shows a schematic diagram of a combustion chamber operating with a direct fuel injector.
Figure 3:
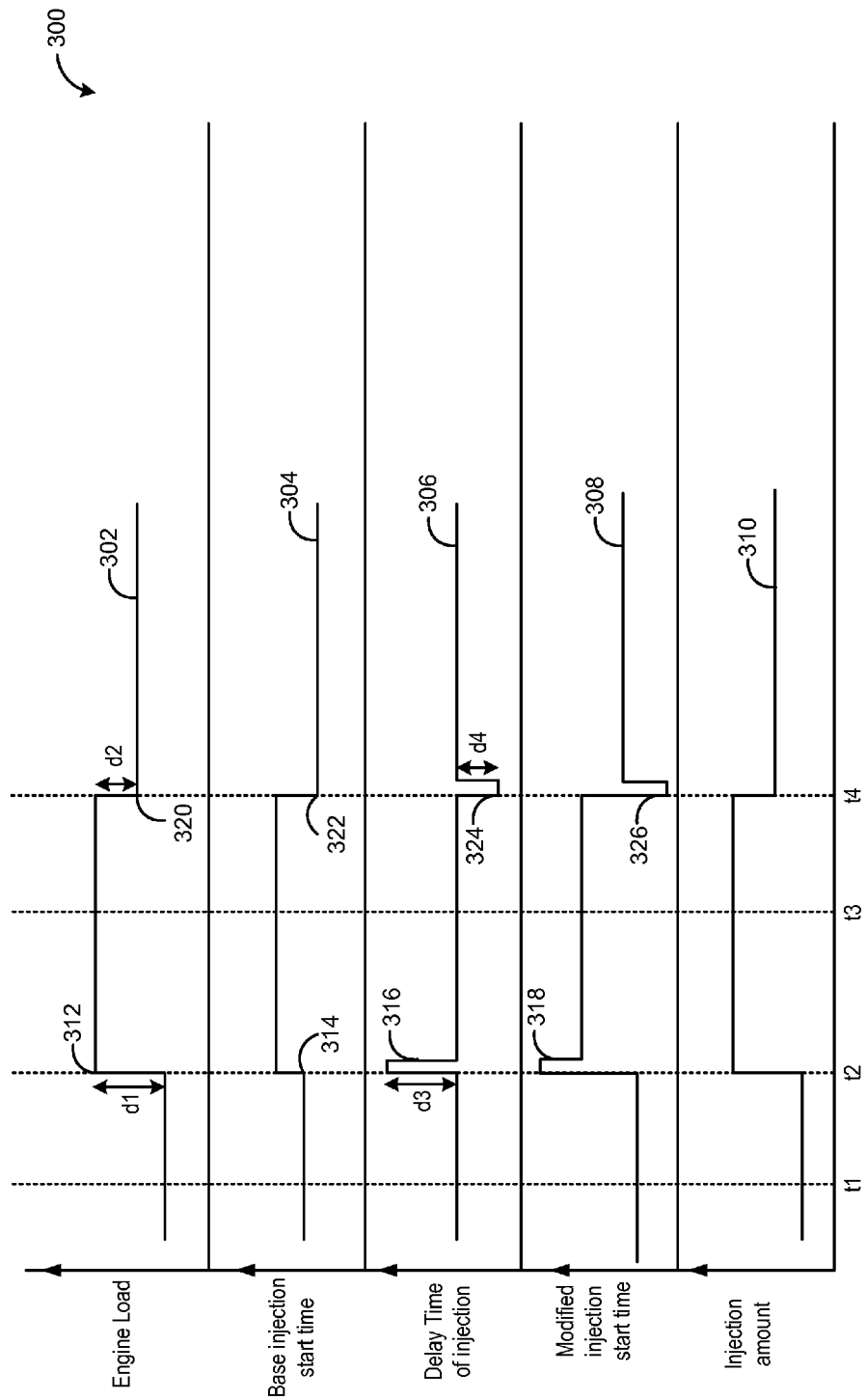
FIG. 3 shows a graph illustrating fuel injection timing based on engine load.
Figure 4:
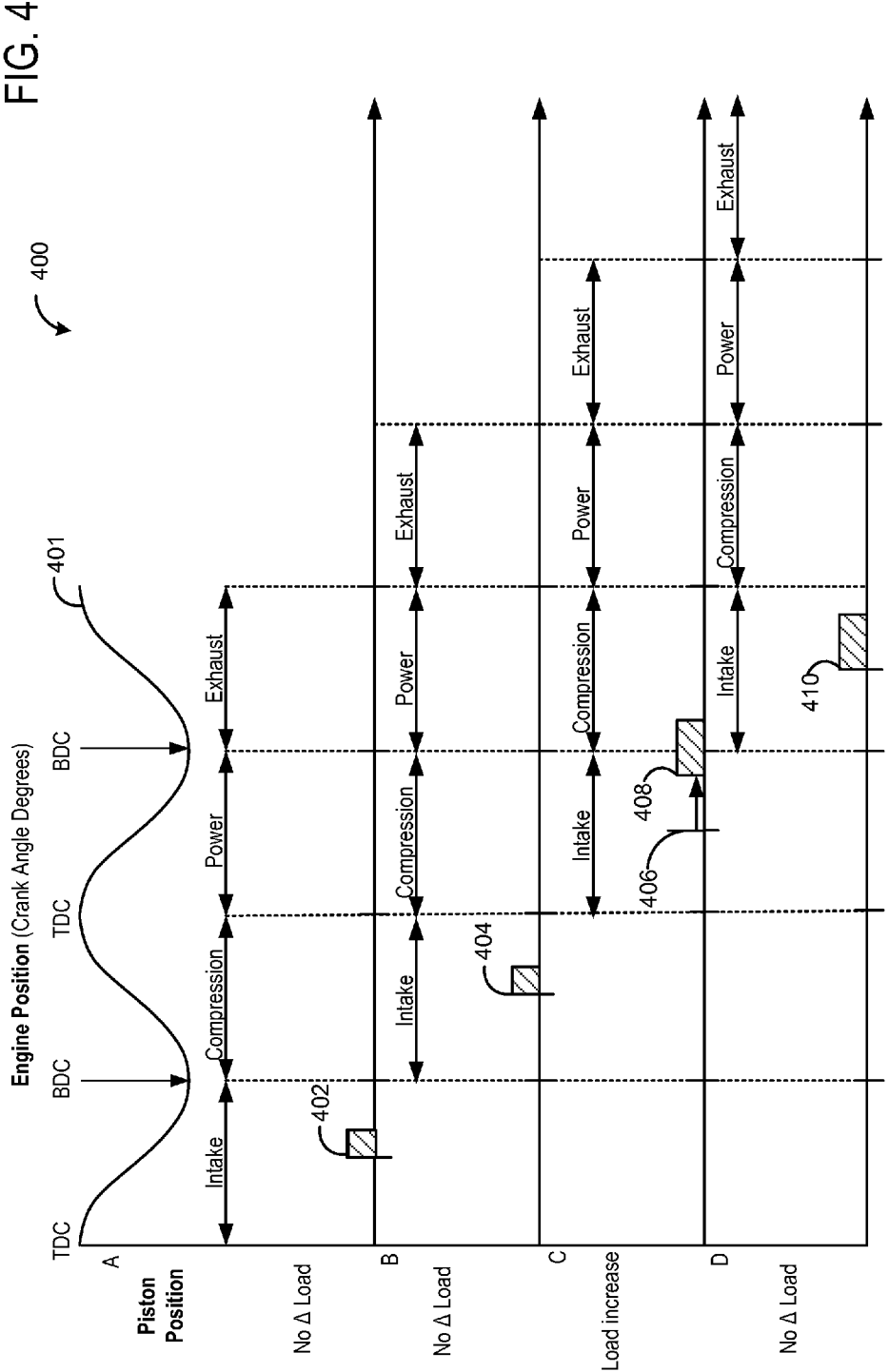
FIG. 4 shows a fuel injection timing chart with example variations of injection timing based on engine load.

The following description relates to methods for determining a fuel ignition delay time period of an internal combustion engine. The invention is based on the realization that a significant part of the particulate emissions from direct injection engines arises because the injected atomized fuel strikes the wall of the combustion chamber, e.g. the cylinder head and/or the piston, and burns there. The likelihood of such a process depends on the arrangement of the injection device and on the spatial distribution of the injected fuel. However, the movement of the injected fuel within the combustion chamber means that there is also a dependence upon the exact time sequences during the injection of the fuel. The invention modifies the starting time of the injection of the fuel in accordance with a change in the engine load in order to achieve reduced particulate emissions, as depicted in FIG. 1. It is thereby possible to choose optimum times not only for instantaneous engine power outputs considered to be constant but also for particularly important situations in respect of particulate emissions, such as rapid load changes, as depicted in FIGS. 3-4. Thus, a significant proportion of the total particulate emissions of a motor vehicle arises in starting and acceleration situations, in which a changeover from a cold start or from a low engine power output to a high engine power output takes place within a short time. Since the determination of the actual time of the beginning of fuel injection is dependent not only on the instantaneous engine power output but also or instead on a change in engine power output with respect to time, particulate emissions can be reduced in an effective manner.

FIG. 1 depicts an example embodiment of a combustion chamber or cylinder of internal combustion engine 10. In one example, engine 10 may be a turbocharged engine. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

Fuel may be delivered by the injector to the cylinder during a single cycle of the cylinder. Further, the distribution and/or relative amount of fuel delivered from the injector may vary with operating conditions, such as aircharge temperature, as described herein below. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such, each cylinder may similarly include its own set of intake/exhaust valves, fuel injector(s), spark plug, etc.

While not shown, it will be appreciated that engine 10 may further include one or more exhaust gas recirculation passages for diverting at least a portion of exhaust gas from the engine exhaust to the engine intake. As such, by recirculating some exhaust gas, an engine dilution may be affected which may improve engine performance by reducing engine knock, peak cylinder combustion temperatures and pressures, throttling losses, and NOx emission. The one or more EGR passages may include a low pressure (LP)-EGR passage coupled between the engine intake upstream of the turbocharger compressor and the engine exhaust downstream of the turbine, and configured to provide LP-EGR. The one or more EGR passages may further include a high pressure (HP)-EGR passage coupled between the engine intake downstream of the compressor and the engine exhaust upstream of the turbine, and configured to provide HP-EGR. In one example, an HP-EGR flow may be provided under conditions such as the absence of boost provided by the turbocharger, while an LP-EGR flow may be provided during conditions such as the presence of turbocharger boost and/or when an exhaust gas temperature is above a threshold. The LP-EGR flow through the LP-EGR passage may be adjusted via an LP-EGR valve while the HP-EGR flow through the HP-EGR passage may be adjusted via an HP-EGR valve (not shown).

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed.

Figure 2:
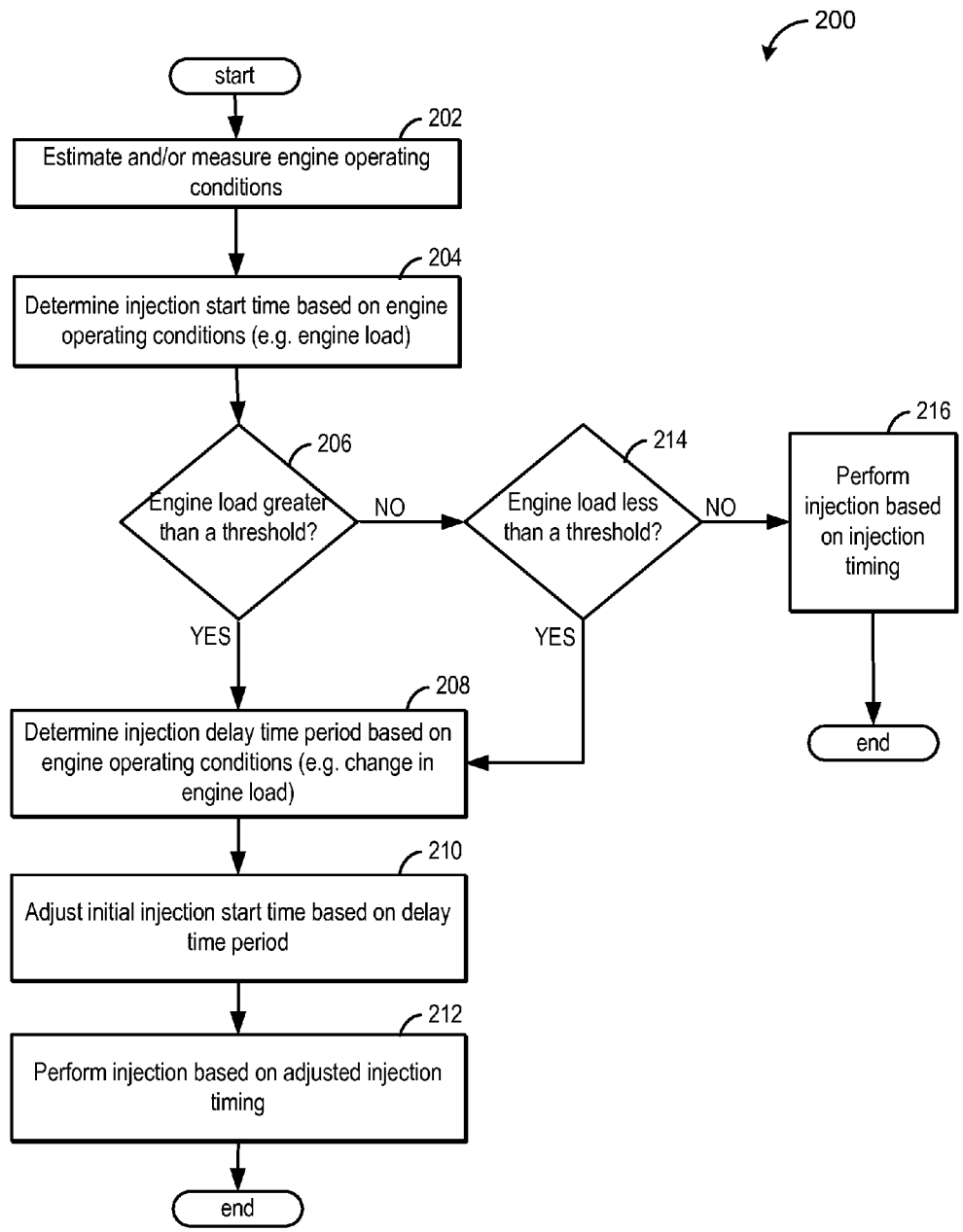
FIG. 2 shows an example method for determining a fuel ignition delay time period of an internal combustion engine.

Referring to FIG. 2 the method 200 includes determining a fuel injection delay time period of an internal combustion engine. A fuel injection delay time period may be calculated in order to prevent impingement of fuel on the wall of the combustion chamber including the cylinder head and/or piston. Further, the movement of the injected fuel within the combustion chamber may depend on fuel injection timing. As such, the fuel injection delay time period may be determined by a change in engine load.

At 202, the method includes estimating and/or inferring engine operating conditions. Engine operating conditions may include, for example, engine speed, engine temperature, catalyst temperature, boost level, MAP, MAF, ambient conditions (temperature, pressure humidity, etc.). At 204, the method includes determining an injection start time based on engine operating conditions. For example, a first start time (e.g. base injection start time) may be determined during a low engine load (e.g. engine start). In another example, a first injection start time may be determined as an absolute time, as a time relative to a beginning of a revolution cycle or relative to the duration of a period of a revolution cycle.

At 206, the method includes determining if a second engine load at a second time is greater than a first engine load at a first time. A delay time period may be determined when a first and second engine power outputs are compared with each other. A second engine power output may be determined based on an elapsed time since the determination of the first engine power output. Therefore, it may be possible to obtain information on the change in engine power output with respect to time from the comparison of the first and the second engine power output. For example, an engine load may be determined at a second time following a rapid change in engine load. If an engine load at a second time is not greater than a first engine load, then the method, at 214, includes determining if an engine load at a second time is less than an engine load at a first time. For example, a second engine load may be determined at a second time during a time when an engine load may be decreasing. If a second engine load is not less than a first engine load, at 216, fuel injection timing may be performed based on the initial injection start time (e.g. constant engine load).

Returning to 206, if a second engine load is greater than a first engine load, at 208, the method includes determining an injection delay time period based on engine operating conditions. In one example, a delay time period may have a positive value when the second engine load is greater than a first engine load. Specifically, for a load change with an increasing engine load, the beginning of a fuel injection may be delayed, as described below with regard to FIGS. 3-4. In another example, if a delay time period has a positive value, the injection valve may be positioned at a distance greater than a threshold from the piston and less fuel may reach the piston and/or the wall of the combustion chamber.

Additionally, at 214, if it has been determined that a second engine load is less than a first engine load, an injection delay time period is determined, at 208. In one example, the delay time period may have a negative value when the second engine load is less than the first engine load. Therefore, the delay time period may be brought forward in time when compared to the base injection start time, as described below with regard to FIGS. 3-4.

In yet another example, the delay time period may fall to zero when the second engine load is equal to the first engine load or when the second engine load differs from the first engine load by less than a threshold value. As such, a constant engine power output may be assumed, for which the determined injection start time may remain unchanged, as described below with regard to FIGS. 3-4.

In another embodiment, the method 200 may include re-determining a second engine power output as a first engine load and a new value for the second engine load may be determined. As a result, the instantaneous engine power output may be determined once for each determination of the delay time period. In general, the delay time period may be re-determined for each revolution cycle or may be held constant for a fixed time period or for a fixed number of revolution cycles. In another example, the delay time period may be kept constant for a number of revolution cycles or time periods dependent on the engine speed or engine load.

In another embodiment, the delay time period may have a first magnitude when the second engine load differs from the first engine load by a first load difference, and the delay time period may have a second magnitude different from the first magnitude when the second engine load differs from the first engine load by a second load difference different from the first load difference. The delay time period may be a function of the load difference between the first and the second engine load, for example. As a result, the method 200 advantageously takes account of the size of the load change of the internal combustion engine and may provide suitable delay time periods for any size of load change. In particular, the first magnitude can be greater than the second magnitude when the first load difference is greater than the second load difference. For example, the delay time period may be proportional to a difference between the second engine load and the first engine load divided by a time interval between the second time and the first time.

In yet another embodiment, the method may include determining a temperature of the combustion chamber. In this case, for example, the method 200 may include determining a delay time period including a modified injection start time when the temperature of the combustion chamber is less than a threshold value. In another example, the value for the second engine load, at 206, may be determined based on temperature within the combustion chamber at a second time. Further, the temperature of the combustion chamber at a second time may be compared to the temperature at a first time in order to determine a delay time period.

Now referring to FIG. 3, an example graph 300 for illustrating fuel injection timing based on engine load is shown. As such, fuel injection timing may include modifying a fuel injection start time based on a delay time period. A delay time period may be based on a change in engine load, for example.

Graph 300 depicts engine load conditions at plot 302 as well as example injection timing graphs including a base injection start time at plot 304, a delay time period at plot 306, a modified injection start time at plot 308, and the fuel injection amount at plot 310. As such, all the plots depict conditions for a given engine cylinder. In another example, injection timing may be based on one injection per engine cycle. Prior to t1, the engine may be running and combusting. For example, at t1, a base injection start time may be determined following determination of a first engine load. In one example, a first engine load may be based on an engine start. In another example, a first engine load determination may be during a constant engine power output. Further, an injection delay time period may be determined by comparing a first engine load at a first time, t1, with a second engine load at a second time, t2. For example, at 312, an engine load may increase thereby causing a second engine load to be greater than a first engine load. As a result of an increasing engine load, at 316, the delay time period may have a positive value such that the delay time period may occur later in time than the base injection start time, as described further with regard to FIG. 4. In one example, the duration of the delay time period, d3, may be proportional to the change in engine load, d1. As such, a larger engine load change may include a longer delay time period. In an additional example, a smaller load change may include a shorter delay time period. Following an increase in engine load, at 318, a modified injection start time may be at a time point greater than the base injection start time, shown at 314.

In another example, a constant engine power output may not change the injection start time. As such, a first engine load, at t2, may be equal to a second engine load, at t3. Since the engine loads may be equal, the delay time period may be at zero and the base injection start time may not be modified. In another example, an injection start time may not be modified if the second engine load differs from a first engine load by less than a threshold value, as described further with regard to FIG. 4.

In yet another example, a second engine load may differ from a first engine load such that the second engine load may be less than the first engine load. For example, an engine load may decrease, at t4, and a delay time period may have a negative value, at 324. In one example, the decrease in engine load, d2, may be proportional to the duration of the delay time period, d4. As such, the modified injection time, at 326, may be earlier in time than the base injection start time, at 322, as described further with regard to FIG. 4. In addition, the amount of fuel injected into the cylinder may not change based on modification of the injection start time. Specifically, the amount of fuel injected at a base starting time, at 314, may be equal to the amount of fuel injected at a modified injection start time, at 318.

In another embodiment, modification of the injection start time of the fuel injection may be based on the temperature of the combustion chamber. As such, the generation of particulates may depend on the temperature of the combustion chamber. Since the delay time period may be determined in accordance with the temperature of the combustion chamber, the actual time of the beginning of fuel injection may be optimized in order to allow a minimum amount of particulate emissions. Specifically, a greater amount of particulates may be generated at lower combustion chamber temperatures. In one example, the injection start time may be modified when the combustion chamber is at a temperature below a threshold temperature. As such, modifying the injection start time based on temperature may prevent particulate emissions.

Since direct measurement of the temperature of the combustion chamber is difficult, the temperature of the combustion chamber may be calculated using a mathematical model based on engine operating conditions. Such operating conditions may take into account previous engine power outputs, but can also include measured values for the temperatures of the inlet air, the fuel mixture, the exhaust gas, and or estimated values for the mass flow.

In one embodiment, the delay time period has a third magnitude when the temperature of the combustion chamber has a first temperature value, and a fourth magnitude, which is less than the third magnitude, when the temperature of the combustion chamber has a second temperature value, which is greater than the first temperature value. Thus, the selected delay time period may be moved forward in time. For example, the higher the temperature of the combustion chamber, the delay time of the time of the beginning of fuel injection may be smaller (in absolute or relative terms), the warmer the combustion chamber becomes.

In one example, a plurality of injections of fuel into the combustion chamber of the internal combustion engine may be performed in a revolution cycle. An associated starting time for each injection may be determined in accordance with operating conditions of the internal combustion engine. Further, the fuel for each injection may be injected into the combustion chamber beginning at a time offset from the associated injection start time based on the delay time period. In one example, the injections may be performed by different injection devices on the same combustion chamber.

As described above, adjusting the start of injection may be based on a current engine load. As such, in response to an increase in engine load, modifying injection timing may include temporarily delaying a start of injection of directly injected fuel to an engine cylinder. Additionally, in response to a decrease in engine load, modifying injection timing may include temporarily advancing the start of injection of directly injected fuel to the engine cylinder. In one example, the start of injection may be permanently delayed at higher engine loads as compared to lower engine loads. In another example, the start of injection may be permanently advanced at higher engine loads as compared to lower engine loads.

Now referring to FIG. 4, graph 400 depicts modifications of fuel injection timing with reference to their location within the four strokes (intake, compression, power, and exhaust) of the engine cycle. As such, fuel injections may include injection timing within an intake stroke or partially within a compression stroke of an engine. Further, the injection start time within the intake stroke may be modified based on engine load, as described below with regard to FIG. 3.

Examples A-D depicts fuel injection timing modifications based on engine load. Example A depicts an engine position along the x-axis in crank angle degrees (CAD). Curve 401 depicts piston positions, with reference to their location from top dead center (TDC) and/or bottom dead center (BDC), and further with reference to their location within the four strokes (intake, compression, power, and exhaust) of the engine cycle. As indicated by sinusoidal curve 401, a piston moves downward from TDC, bottoming out at BDC by the end of the intake stroke. The piston then returns to the top, at TDC, by the end of the compression stroke. The piston then again moves back down, towards BDC, during the power stroke, returning to its original top position at TDC by the end of the exhaust stroke. Further, examples A-D may depict fuel injection start times within an engine cycle at t1 and t2, as shown above with regard to FIG. 3. Further, injection timing shown in examples A-D may occur within one engine cycle of combustion event. In one example, in response to an increase in engine load, modifying injection timing may include temporarily delaying a start of injection of directly injected fuel to an engine cylinder for at least one, but less than three, combustion events, and then only partially reducing the delay of the start of injection. In another example, in response to a decrease in engine load, modifying injection timing may include temporarily advancing the start of injection of directly injected fuel to the engine cylinder for at least one, but less than three, combustion events, and then only partially the advancement of the start of injection. As such, the start of injection and a completion of injection are both during a compression stroke. Therefore, an injection timing shown in example A may occur one engine cycle prior to example B, example B may occur one engine cycle prior to example C, and example C may occur one engine cycle prior to example D. In one example, as shown at A, a fuel injection may include a fuel injection start time, at 402, within the intake stroke during engine operating conditions. The injection may include injection timing at the midpoint of the intake stroke such that the piston position may be moving downward towards BDC.

In another example, however, the compression fuel injection may be given a base injection start time. The base injection start time, as illustrated at B, may be determined by a first engine load. In this example, an injection start time, at 402, may be based on an engine load that remains constant (e.g. no change in engine load). As such, the injection may include injection timing at the midpoint of the intake stroke.

In another example, as illustrated at C, the injection start time may be given a modified injection start time based on a change in engine load. Specifically, a delay time period may be determined by comparing a first engine load at a first time with a second engine load at a second time. In this example, a second engine load may be greater than a first engine load. The base injection start time, at 406, may have a delay time period with a positive value. Therefore, a modified injection start time, at 408, may be more forward in time, as compared to the base injection start time (as depicted by an arrow). In an additional example, the modified injection start time may be partially within the compression stroke. At the modified injection start time, the piston may be positioned at BDC. As such, the distance between the injection valve and the piston at the modified injection start time may be greater than the distance to the piston at the base injection start time. At the modified injection start time less fuel may reach the piston and the wall of the combustion chamber. In one example, a modified injection time, partially within the combustion stroke, may reduce the generation of particulates.

In another example, as illustrated at D, the injection start time may be further modified based on a re-determined delay time period. In this example, the second engine load, as illustrated at C, may be used as a first engine load. Therefore, a new value for a second engine load may be determined. For example, a delay time period may be re-determined based on a re-determined first and second engine load. In this example, a second engine load may be equal to a first engine load (e.g. a constant engine load). Therefore, a delay time period may have a value of zero. As such, the determined injection time, at 410, may be similar to the base injection start time, shown at 404. As such, the base injection start time, at 410, may not be modified since there was no change in engine load. Further, the injection start time may be in an intake stroke of an engine.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A control method for an internal combustion engine, comprising:
   calculating an initial starting time for when an injection of fuel will be injected into a combustion chamber of the internal combustion engine in accordance with operating parameters of the internal combustion engine;
   detecting a first engine load of the internal combustion engine at a first time;
   detecting a second engine load of the internal combustion engine at a second time following the first time;
   comparing the first engine load with the second engine load;
   calculating a delay time period in accordance with a result of the comparison of the first and the second engine load; and
   injecting the fuel into the combustion chamber of the internal combustion engine, beginning at a time offset from the initial starting time by the delay time period, wherein the delay time period has a positive value when the second engine load is greater than the first engine load, and wherein the delay time period has a negative value when the second engine load is less than the first engine load, wherein the delay time period is furthermore calculated in accordance with a temperature of the combustion chamber of the internal combustion engine, and wherein the delay time period has a first magnitude when the temperature of the combustion chamber has a first temperature value, and in which the delay time period has a second magnitude, which is less than the first magnitude, when the temperature of the combustion chamber has a second temperature value, which is greater than the first temperature value.

2. The method of claim 1, wherein a system includes detecting engine load at a time before the initial starting time.

3. The method of claim 1, wherein the delay time period has a third magnitude when the second engine load differs from the first engine load by a first load difference, and in which the delay time period has a fourth magnitude different from the third magnitude when the second engine load differs from the first engine load by a second load difference different from the first load difference.

4. The method of claim 3, wherein the third magnitude is greater than the fourth magnitude when the first load difference is greater than the second load difference.

5. The method of claim 3, wherein the delay time period is proportional to a difference between the second engine load and the first engine load divided by a time interval between the second time and the first time.

6. The method of claim 1, wherein a plurality of injections of fuel into the combustion chamber of the internal combustion engine is performed in a revolution cycle, wherein an associated initial starting time for each injection is calculated in accordance with operating parameters of the internal combustion engine, and the fuel for each injection is injected into the combustion chamber of the internal combustion engine beginning at a time offset from the associated initial starting time by the delay time period.

7. The method of claim 1, wherein fuel is injected beginning at a time offset from the initial starting time by the positive value of the delay time period when the second engine load is greater than the first engine load for at least one, but less than three, combustion events, and after completion of the at least one but less than three combustion events, fuel is injected at the initial starting time.

8. The method of 7, wherein fuel is injected beginning at a time offset from the initial starting time by the negative value of the delay time period when the second engine load is less than the first engine load for at least one, but less than three, combustion events, and after completion of the at least one but less than three combustion events, fuel is injected at the initial starting time.

9. A control method for an internal combustion engine, comprising:
   calculating an initial starting time for an injection of fuel into a combustion chamber of the internal combustion engine in accordance with operating parameters of the internal combustion engine;
   detecting a first engine load of the internal combustion engine at a first time;
   detecting a second engine load of the internal combustion engine at a second time following the first time;
   comparing the first engine load with the second engine load;
   calculating a delay time period in accordance with a result of the comparison of the first and the second engine load; and
   injecting the fuel into the combustion chamber of the internal combustion engine, beginning at a time offset from the initial starting time by the delay time period, wherein the delay time period has a positive value when the second engine load is greater than the first engine load, and wherein the delay time period has a negative value when the second engine load is less than the first engine load, wherein fuel is injected beginning at a time offset from the initial starting time by the positive value of the delay time period when the second engine load is greater than the first engine load for at least one, but less than three, combustion events, and after completion of the at least one but less than three combustion events, fuel is injected at the initial starting time.

10. The method of 9, wherein fuel is injected beginning at a time offset from the initial starting time by the negative value of the delay time period when the second engine load is less than the first engine load for at least one, but less than three, combustion events, and after completion of the at least one but less than three combustion events, fuel is injected at the initial starting time.

* * * * *